(12) United States Patent
Campos et al.

(10) Patent No.: US 10,016,933 B2
(45) Date of Patent: Jul. 10, 2018

(54) ROTATIONAL ASSEMBLY METHOD AND APPARATUS

(71) Applicant: Apple Inc., Cupertino, CA (US)

(72) Inventors: Fabio T. Campos, San Francisco, CA (US); Keith J. Hendren, San Francisco, CA (US); Laura M. DeForest, San Mateo, CA (US); Michelle R. Goldberg, Sunnyvale, CA (US); Kelsey J. MacMillan, Berkeley, CA (US); Bryan J. Licata, San Jose, CA (US)

(73) Assignee: Apple Inc., Cupertino, CA (US)

( * ) Notice: Subject to any disclaimer, the term of this patent is extended or adjusted under 35 U.S.C. 154(b) by 641 days.

(21) Appl. No.: 14/183,253

(22) Filed: Feb. 18, 2014

(65) Prior Publication Data

US 2014/0310943 A1 Oct. 23, 2014

Related U.S. Application Data

(60) Provisional application No. 61/815,225, filed on Apr. 23, 2013.

(51) Int. Cl.
*B23B 31/16* (2006.01)
*B25B 11/00* (2006.01)
(Continued)

(52) U.S. Cl.
CPC ........ *B29C 65/4825* (2013.01); *G06F 1/1626* (2013.01); *B23B 31/14* (2013.01);
(Continued)

(58) Field of Classification Search
CPC ...... B23B 31/16; B25B 11/002; F16B 11/002; F16B 11/006; G06F 1/1626; G06F 1/1628;
(Continued)

(56) References Cited

U.S. PATENT DOCUMENTS 2,087,539 A * 7/1937 Greene .................... B67B 3/02
221/190
2,444,155 A * 6/1948 De Back ................ B65B 3/323
141/144
(Continued)

FOREIGN PATENT DOCUMENTS

CN 1592560 A 3/2005
CN 101971315 A 2/2011
(Continued)

OTHER PUBLICATIONS

Chinese Patent Application No. 201410163911.6—First Office Action dated Dec. 23, 2016.
(Continued)

*Primary Examiner* — Bayan Salone
(74) *Attorney, Agent, or Firm* — Downey Brand LLP

(57) ABSTRACT

The described embodiments relate generally to methods of assembly of electronic devices. In particular, a rotationally induced pressure is used to activate a securing mechanism positioned between a component and an enclosure. The component and the securing mechanism may be located in an inaccessible region of the enclosure such that traditional, direct, assembly processes may not be feasible. The securing mechanism may take the form of a layer of pressure sensitive adhesive or a fastener between the component and an interior surface of the enclosure.

20 Claims, 10 Drawing Sheets

(51) Int. Cl.
  *F16B 11/00* (2006.01)
  *G06F 1/16* (2006.01)
  *B29C 65/48* (2006.01)
  *B23B 31/14* (2006.01)

(52) U.S. Cl.
  CPC .......... *F16B 11/006* (2013.01); *Y10T 29/4995* (2015.01); *Y10T 29/49947* (2015.01); *Y10T 29/49952* (2015.01); *Y10T 29/49954* (2015.01); *Y10T 29/53974* (2015.01); *Y10T 279/24* (2015.01); *Y10T 279/247* (2015.01)

(58) Field of Classification Search
  CPC .......... B29C 65/4825; Y10T 29/49947; Y10T 29/4995; Y10T 29/49952; Y10T 29/49954; Y10T 29/53974; Y10T 279/24; Y10T 279/247
  USPC .... 29/525.01, 525.03–525.05; 269/138, 291, 269/900, 289 R
  See application file for complete search history.

(56) References Cited

U.S. PATENT DOCUMENTS

| | | | | |
|---|---|---|---|---|
| 3,365,088 A * | 1/1968 | Turner | ................ | B65D 50/046 215/213 |
| 3,464,576 A * | 9/1969 | Rohde | ............... | B65D 55/0845 215/252 |
| 3,473,691 A * | 10/1969 | Asmus | ............... | B65D 41/0442 220/296 |
| 4,135,560 A * | 1/1979 | Eang | ......................... | B65B 1/14 141/198 |
| 4,342,345 A * | 8/1982 | Nadin | ................ | B65G 69/0458 141/392 |
| 4,747,499 A * | 5/1988 | Gach | .................... | B65D 51/145 215/250 |
| 5,207,048 A * | 5/1993 | Wysocki | ............... | B67B 3/2033 53/133.2 |
| 5,676,360 A * | 10/1997 | Boucher | ................. | B23Q 1/52 269/57 |
| 6,050,436 A * | 4/2000 | Bennett | ............. | B65D 41/3428 215/251 |
| 6,375,178 B1 * | 4/2002 | Schilb | ..................... | B23Q 1/66 269/71 |
| 6,390,894 B1 * | 5/2002 | Beel | ......................... | B23F 5/02 409/27 |
| 6,390,901 B1 * | 5/2002 | Hiyama | ................. | B24D 9/085 451/285 |
| 6,857,250 B1 * | 2/2005 | Taylor | .................... | B65B 7/285 53/133.2 |
| 6,955,345 B2 * | 10/2005 | Kato | ................... | B23Q 1/5437 269/60 |
| 7,111,746 B2 * | 9/2006 | Miceli | .................. | B65D 50/041 215/219 |
| 7,647,746 B2 * | 1/2010 | Ueda | ........................ | B67B 3/18 53/317 |
| 7,959,141 B2 * | 6/2011 | Makino | .................. | G03B 27/62 269/58 |
| 8,413,972 B2 * | 4/2013 | Osicki | .................... | B23K 37/04 269/329 |
| 8,720,877 B2 * | 5/2014 | Kawamura | .......... | G05B 19/404 269/55 |
| 8,888,083 B2 * | 11/2014 | Hosaka | ................. | B23Q 11/001 269/55 |
| 8,910,375 B2 | 12/2014 | Nakai et al. | | |
| 9,044,854 B2 * | 6/2015 | Sun | ........................ | B25H 1/02 |
| 9,073,152 B2 * | 7/2015 | Westwood | ........ | B23K 37/0435 |
| 2003/0154688 A1 * | 8/2003 | Lang | .................... | B67B 3/2033 53/75 |
| 2004/0033329 A1 * | 2/2004 | Hisada | ................ | B29C 65/4845 428/64.4 |
| 2005/0045782 A1 | 3/2005 | Lee et al. | | |
| 2009/0193759 A1 * | 8/2009 | Ueda | ........................ | B67B 3/18 53/331.5 |
| 2010/0147415 A1 * | 6/2010 | Lafond | .................... | B08B 9/30 141/34 |
| 2011/0047563 A1 * | 2/2011 | Yoon | .................. | G11B 17/0282 720/706 |
| 2012/0244343 A1 * | 9/2012 | Stiehl | ......................... | C09J 5/06 428/332 |

FOREIGN PATENT DOCUMENTS

| | | |
|---|---|---|
| CN | 102501221 A | 6/2012 |
| CN | 202551611 U | 11/2012 |
| EP | 0053838 B1 | 11/1984 |
| EP | 1534621 B1 | 12/2006 |
| WO | 8101137 A1 | 4/1981 |

OTHER PUBLICATIONS

Universal Filling: Problem Solver, 2002, http://www.universalfilling.com/problem_solver/problem_solver.asp#.

* cited by examiner

ROTATIONAL ASSEMBLY METHOD AND APPARATUS

CROSS-REFERENCE TO RELATED APPLICATIONS

This application claims the benefit of U.S. Provisional Application No. 61/815,225, filed Apr. 23, 2013, which is entirely incorporated herein by reference.

FIELD

The described embodiments relate generally to methods for assembly of multi-part devices. In particular, rotationally induced force is used to join parts within an assembly, wherein at least a portion of the parts is hidden or otherwise inaccessible to a direct assembly approach.

BACKGROUND

Using conventional assembly techniques, a component may be attached to an enclosure or other supporting structure using various direct attachment protocols. Using a portable computing device as an example, a battery can be mounted to an interior surface of an enclosure by simply positioning the battery in place and securing the battery to the enclosure using, for example, an adhesive. In this way, any direct assembly technique presupposes that the portion of the enclosure to which the battery is to be secured is directly accessible.

However, in some cases, the enclosure may have a size and/or shape that causes internal regions thereof to not be directly accessible. Accordingly, assembly of components therein using direct mounting techniques may not be possible. As a result, in order to facilitate assembly, enclosures for computing devices and other products are generally designed to minimize or eliminate regions therein that are not readily accessible.

However, in some instances it may be desirable to employ particular designs of enclosures that include regions that are not readily accessible. For example, such designs may be selected for cosmetic or functional reasons. Accordingly, it may be desirable to provide assembly techniques configured to assemble components within regions of an enclosure that are not readily accessible, rather than altering the design of the enclosure.

SUMMARY

This paper describes various embodiments that relate to assembly of devices. In a particular embodiment, rotationally induced forces can be used to place and secure components within regions of an enclosure that are otherwise inaccessible by direct assembly.

In one embodiment, a method for employing a rotationally induced pressure to secure a component within an enclosure is described. The product may be arranged in a partially assembled configuration prior to conducting the method. The partially assembled configuration may include at least one component placed within a substantially inaccessible region of an enclosure. The placement of the component is generally aligned with a target location for final assembly of the component within the enclosure.

In one embodiment, a pressure sensitive adhesive layer is disposed between an interior surface of the inaccessible portion of the enclosure and a surface of the component. The product in the partially assembled configuration is rotated with respect to a center of rotation in accordance with a predetermined rotational velocity profile. The rotational velocity profile may include a constant velocity portion associated with an angular velocity that provides a rotationally induced pressure sufficient to activate the pressure sensitive adhesive. It should be noted that by reversing a direction of the rotationally induced pressure, a rework procedure can be carried out that facilitates removal of the component.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
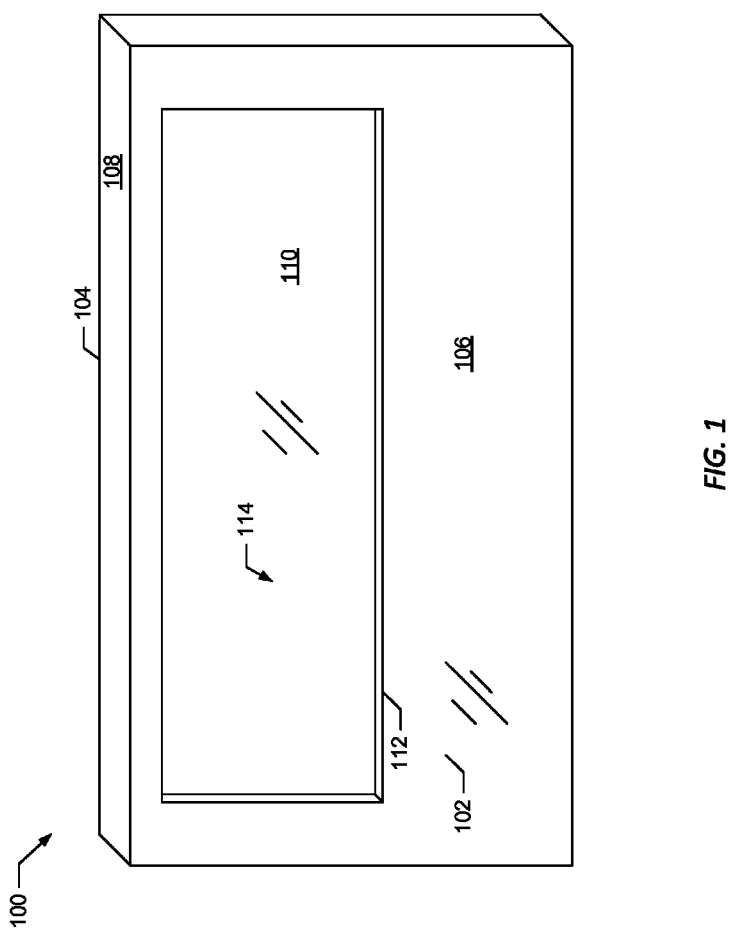
FIG. 1 illustrates a perspective view of an enclosure according to an example embodiment of the present disclosure.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

As described in detail below, the following relates to assembly tools, assemblies, apparatuses, systems, devices, computer program products, and methods. Embodiments of the disclosure may be employed to assemble a variety of components including, for example, electronic devices. By way of more specific example, the assembly methods disclosed herein may be employed to form a computing device such as a desktop computer, a laptop computer, a net book computer, a tablet computer, a cellphone, a smartphone, etc., or any accessory therefore such as a keyboard and a monitor. However it should be understood that various other embodiments of devices may be formed and finished using the tools, assemblies, apparatuses, systems, devices, computer program products, and methods of the present disclosure.

Existing embodiments of portable computing devices and other devices may include multi-piece housings. For example, a portable computing device may include base portion comprising a top case and a bottom case. Accordingly, by providing the top case and the bottom case as discrete items, it may be relatively easy to directly assemble components (e.g., electronic components) therein. For example, electronic components may be inserted in compartments defined by the top case. Thereafter the bottom case may be coupled to the top case to complete the enclosure.

However, as the size of enclosures becomes smaller, direct assembly of components within the enclosure becomes more difficult. In addition to the reduced size, the shape of the enclosure can also restrict the ability to easily assembly components within the enclosure. Furthermore, in some situations, it may be advantageous from a design and/or manufacturing standpoint to pre-form an enclosure prior to placement of any components therein.

In this way, the pre-formed enclosure can have regions, or pockets, within the enclosure that are relatively inaccessible to external agents. For example, an enclosure can be formed in such a way that an opening can be defined in a surface of the enclosure that does not provide direct access to portions of the enclosure away from the opening. These portions (also referred to as pockets or regions) can be considered to be hidden or otherwise inaccessible with respect to the opening. Accordingly, in order to attach or otherwise assemble components within the hidden pockets, an indirect assembly technique and associated apparatuses can be employed.

In one embodiment, an indirect assembly technique can rely upon a rotationally induced pressure provided by an assembly apparatus. The rotationally induced pressure can be associated with a centripetal acceleration corresponding to an angular velocity. In particular, a product in a partially assembled configuration can be placed within a fixture a distance from a center of rotation. The product can include an enclosure having at least one inaccessible portion (or pocket). The enclosure can be pre-formed in such a way as to provide an opening for initial placement of a component. The initial placement of the component can be aligned with a final placement of the component within the inaccessible portion. However, direct affixation of the component at this placement may not be possible, as noted above.

The product in the partially assembled configuration can be rotated by the assembly apparatus about the center of rotation at a pre-determined angular velocity for a pre-determined amount of time sufficient to activate a securing mechanism. The securing mechanism can be used to secure the component to the enclosure within the inaccessible portion. In one embodiment, the securing mechanism can take the form of a layer of pressure sensitive material disposed between an interior surface of the enclosure within the inaccessible portion and a corresponding surface of the component. In another embodiment, the securing mechanism can take the form of a mechanical fastener (e.g., a clasp or snap) that can be activated during the rotation of the partially assembled configuration. In this context, activating a snap, for example, can include mechanically actuating the snap due to the rotationally induced pressure, or force.

In some embodiments, the product in the partially assembled configuration can be placed at a fixed radial distance from the center of rotation. In this way, the product in the partially assembled configuration can experience a rotationally induced pressure commensurate with a rotational velocity profile. The rotational velocity profile can include a ramping up portion characterized as an increasing angular velocity, a constant velocity portion characterized as a constant (or nearly constant) angular velocity, and a ramping down portion characterized as a decreasing angular velocity. Therefore, it is contemplated that the activation of the securing mechanism can be related to the ramping up and constant velocity portions of the rotational velocity profile. The rotational velocity profile can be symmetric or non-symmetric. For example, the slope of the ramping up portion can be different than the slope of the ramping down portion in accordance with characteristics of the partially assembled configuration of the product.

In other cases, the product in the partially assembled configuration can be secured to a central location using a link that responds to the angular velocity of the product about the center of rotation by elongating. In other words, the link can be coupled to the product in the partially assembled configuration and an attachment point about which the product is rotated. As the product in the partially assembled configuration is rotated about the attachment point and the angular velocity increases, the link can elongate until the product is located at a radial distance configured to activate the securing mechanism. In this way, the product in the partially assembled configuration can undergo a more gradual rotational transition that may prove to be advantageous, for example in those situations where it is difficult to vary the angular velocity. By way of further example, if the assembly apparatus has a single rotational speed, it may be advantageous to provide the link that would more gradually introduce the rotationally induced pressure.

In this regard, FIG. 1 illustrates a perspective view of an enclosure 100 in accordance with the described embodiments. The enclosure 100 may comprise a housing for an electronic device in some embodiments. By way of further example, the electronic device can include a portable computing device such as a laptop computer, a portable consumer product such as a smart phone along the lines of an iPhone manufactured by Apple Inc. of Cupertino, Calif.

As illustrated, the enclosure 100 may be substantially enclosed. In this regard, by way of example, the enclosure may comprise a top case 102 that has been coupled (e.g., coupled using any of various known attachment techniques and methods) to a bottom case 104. In this regard, by way of example the top case 102 may define a top panel 106 and a plurality of side panels 108. Further, the bottom case 104 may define a bottom panel 110. The enclosure 100 may include an opening 112, which may be defined through the top panel 106 of the top case 102. The opening 112 may be configured to receive a keyboard therein in some embodiments. As further illustrated in FIG. 1, the enclosure 100 may define a compartment 114 in which various components (e.g., electronic components) may be placed.

Figure 2:
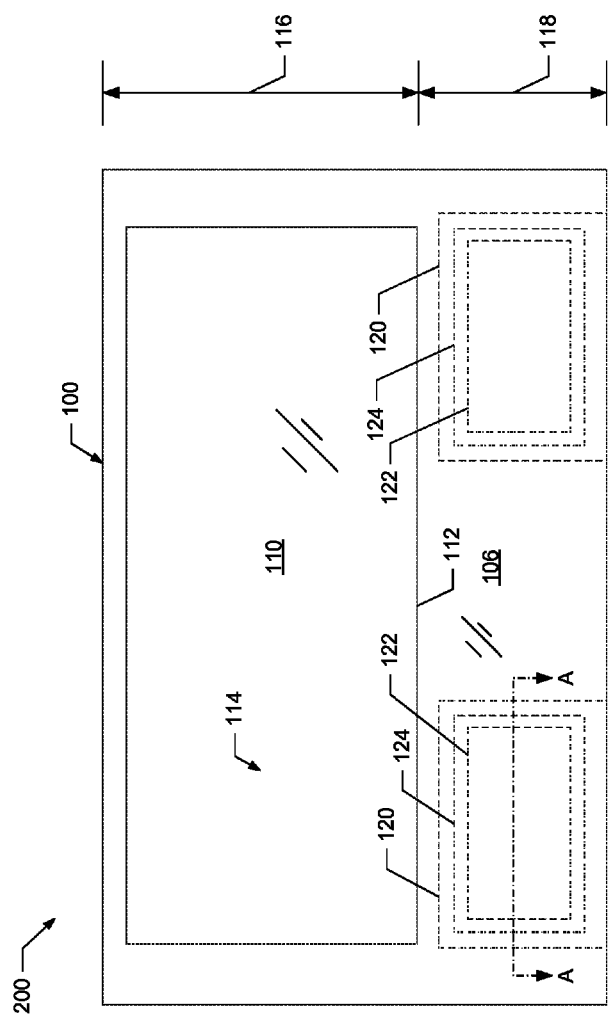
FIG. 2 illustrates a top view of a product comprising the enclosure of FIG. 1 according to an example embodiment of the present disclosure.

FIG. 2 illustrates a top view of a product 200 comprising the enclosure 100. As illustrated, as a result of inclusion of the opening 112 in the enclosure 100, the compartment 114 may define an accessible portion 116, at which traditional direct assembly of components may occur. For example, components may be inserted through the opening 112 and physically pressed into place or otherwise affixed in that accessible portion 116 of the compartment 114 using traditional assembly methods.

However, as a result of the opening 112 not extending down the entirety of the top panel 106, the compartment 114 may further comprise an inaccessible portion 118. Note that the term inaccessible, as used herein, refers to a region which is difficult or impossible to perform traditional direct assembly operations therein. Thus, for example, although it may be possible to insert one or more components into the inaccessible portion 118 of the compartment 114, it may be difficult or impossible to affix the components to the enclosure 100 using traditional direct assembly techniques once inserted therein.

Thus, the compartment 114 can include one or more inaccessible regions or pockets 120 between the top panel 106 and the bottom panel 110 into which one or more components 122 may be placed in order to complete assembly of the product 200. In some embodiments the components 122 may include electronic components such as a mass storage device (e.g., a hard drive or a solid state storage device such as a flash memory device including non-transitory and tangible memory that may be, for example, volatile and/or non-volatile memory) configured to store information, data, files, applications, instructions or the like, a processor (e.g., a microprocessor or controller) configured to control the overall operation of the portable electronic device, a communication interface configured for transmitting and receiving data through, for example, a wired or wireless network such as a local area network (LAN), a metropolitan area network (MAN), and/or a wide area network (WAN), for example, the Internet, a fan, and a heat pipe. However, various other components may additionally or alternatively be received in the pockets 120 as may be understood by one having skill in the art.

For example, the components 122 can as additionally or alternatively include battery cells or any other components having a size and shape configured for receipt within the pockets 122. The battery cells can include electrical connectors, such as a flex connector, used to electrically connect the battery cells to other electronic components within the enclosure 100 and/or each other. In some embodiments the electrical connections may be formed at the time of, or prior to, positioning the components 122 in the compartment 114 to define the partially assembled configuration. However, in other embodiments the rotational assembly operations described herein may form electrical connections during affixation.

Further, the product 200 may include one or more securing mechanisms 124 positioned in the pockets 120. The securing mechanisms 124 may be configured to couple the components 122 to the enclosure 100 such that the components are securely retained in the pockets 120. For example, the securing mechanisms 124 may be respectively positioned between the components 122 and the bottom panel 110 of the enclosure 100. Thereby, the securing mechanisms 124 may be configured to secure the components 122 to the bottom panel 110 of the enclosure 100. Thus, the securing mechanisms may be positioned radially outwardly from the components 122 and radially inwardly from the portion of the enclosure 100 to which the components affix during rotation about an axis.

In some embodiments the securing mechanisms 124 may comprise a pressure sensitive material such as a pressure sensitive adhesive ("PSA") or a pressure sensitive tape configured to form a bond upon application of compressive pressure thereto. In this regard, by compressing the pressure sensitive material between the components 122 and the bottom panel 110 of the enclosure 100, the components may be securely affixed to the enclosure.

In another embodiment, the securing mechanisms 124 may comprise fasteners configured to mechanically couple the components 122 to the enclosure 100. For example, the fasteners may comprise connectors, clasps, or snaps, or any other embodiment of mechanical device configured to employ mechanical interaction (e.g., via interference fit) to secure the components 122 to the enclosure 100 when pressed together. Further, as noted above, in some embodiments the fasteners may comprise electrical connectors configured to form an electrical connection between the components 122 and corresponding electrical components.

However, as noted above, directly pressing the components 122 against the securing mechanisms 124 may not be feasible as a result of the pockets 120 being substantially inaccessible. Accordingly, embodiments of assembly apparatuses configured to indirectly induce pressure on components to press the components toward securing mechanisms to secure the components an enclosure are provided.

Figure 3:
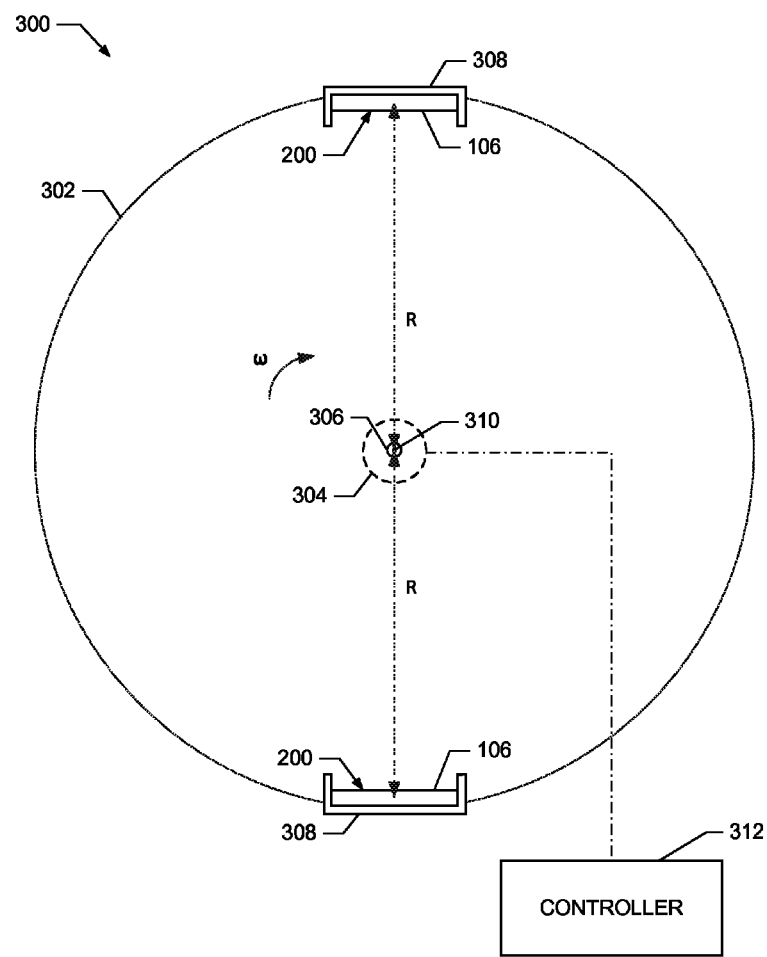
FIG. 3 illustrates a top view of an assembly apparatus including fixtures fixedly coupled to a rotary table according to an example embodiment of the present disclosure.

In this regard, FIG. 3 illustrates an overhead view of an embodiment of an assembly apparatus 300 configured to assemble the product 200. In this regard, the assembly apparatus 300 may include a rotary platen or table 302 configured to rotate the product 200 in the partially assembled configuration to activate the securing mechanisms 124 to secure the one or more components 122 to the enclosure 100. In order to rotate the rotary table 302, the assembly apparatus 300 may include a motor 304 (e.g., an electric, pneumatic, or hydraulic motor) which may drive a shaft 306 coupled to the rotary table. More particularly, the shaft 306 may be coupled to a center of the rotary table 302.

As illustrated, the assembly apparatus 300 may further comprise one or more nests or fixtures 308. The fixtures 308 may be configured to receive a product (e.g., the product 200), in a partially assembled configuration, therein. As illustrated in some embodiments, multiple fixtures 308 may be symmetrically arrayed about a central axis 310 (e.g., extending through the shaft 306) about which the rotary table 302 is configured to rotate. In this way, any dynamic instabilities (such as shakes or wobbles) induced during rotation of the rotary table 302 can be minimized or avoided altogether by substantially symmetrically distributing mass about the central axis 110. Alternatively, separate masses may be applied to the rotatory table 302 to balance the rotary table.

In this arrangement, a rotational force can be generated by the motor 304 and imparted to rotary table 302 by way of the shaft 306. In some embodiments, the motor 304 can be a direct drive motor having a single speed (or multiple single speeds) or the motor can provide an adjustable and variable rotational speed. For example, a controller 312 may be employed to control the motor 304 and provide for control over the rotational velocity thereof (e.g., by regulating current applied to the motor). In some cases, a gearing arrangement may additionally or alternative be employed to provide for variable rotational speed of the rotary table 302.

The assembly apparatus 300 may thus be configured to rotate the rotary table 302 to activate the securing mechanism 124 to secure the components 122 to the enclosure 100. In order for the assembly apparatus 300 to properly apply force to activate the securing mechanism 124, a particular configuration of the securing mechanism and the component 122 may be employed. In this regard, the component 122 may be positioned radially inwardly from the securing mechanism 124 and the portion of the enclosure 100 to which the securing mechanism affixes may be positioned radially outwardly from the securing mechanism, in terms of rotation about the central axis 310.

Figure 4:
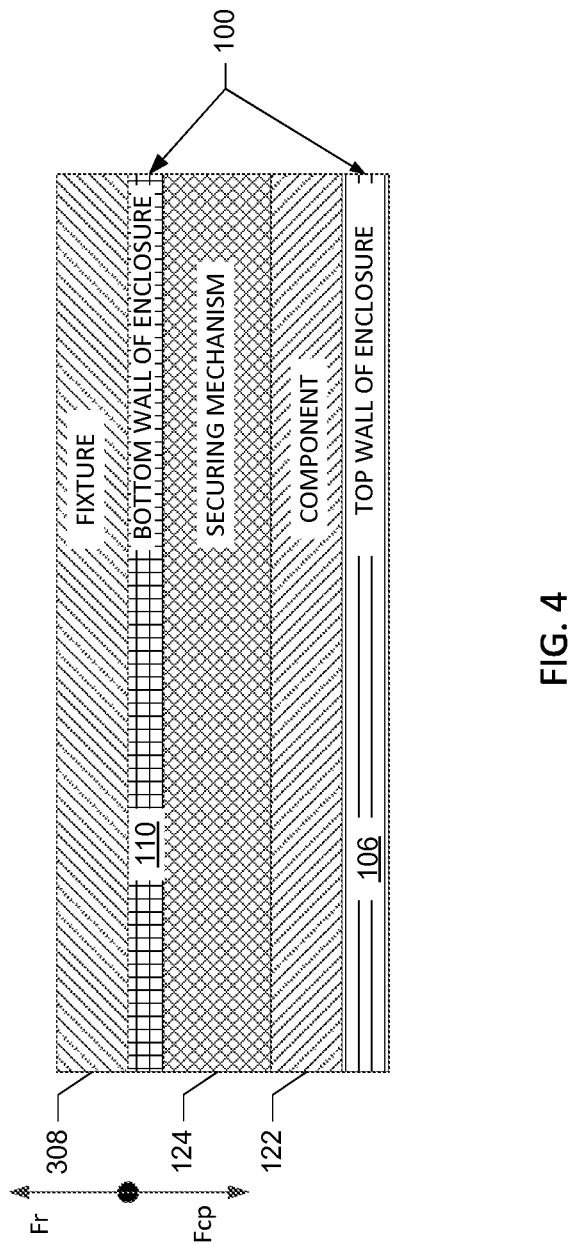
FIG. 4 illustrates a sectional view through the product of FIG. 2 along line A-A when engaged with the fixture of FIG. 3 according to an example embodiment of the present disclosure.

For example, FIG. 4 illustrates a cross-sectional view through the product 200 along line A-A from FIG. 2 when the product is received in the fixture 308. FIG. 4 further illustrates a rotationally-induced centripetal force Fcp created by rotation of the product 200 in the partially assembled configuration about the axis 310 at an angular velocity ω. The force Fcp may be defined by the following equation:

$$Fcp = M \times R \times \omega^2 \quad \text{Eq. (1)},$$

wherein:
M is the mass of the product 200;
R is the radius of the product from the axis 310; and
ω is the angular velocity of the product.

As further illustrated in FIG. 4, the fixture 308 may provide a reactive force Fr, which may be equal in magnitude to the centripetal force Fcp. The centripetal force Fcp may be directed toward the central axis 310, and the reactive force Fr may be directed away from the central axis. Accordingly, the centripetal force Fcp and the reactive force Fr may counteract one another such that the product 200 is retained at a substantially constant distance R (see, FIG. 3) from the axis 310 as the product rotates thereabout.

Figure 5:
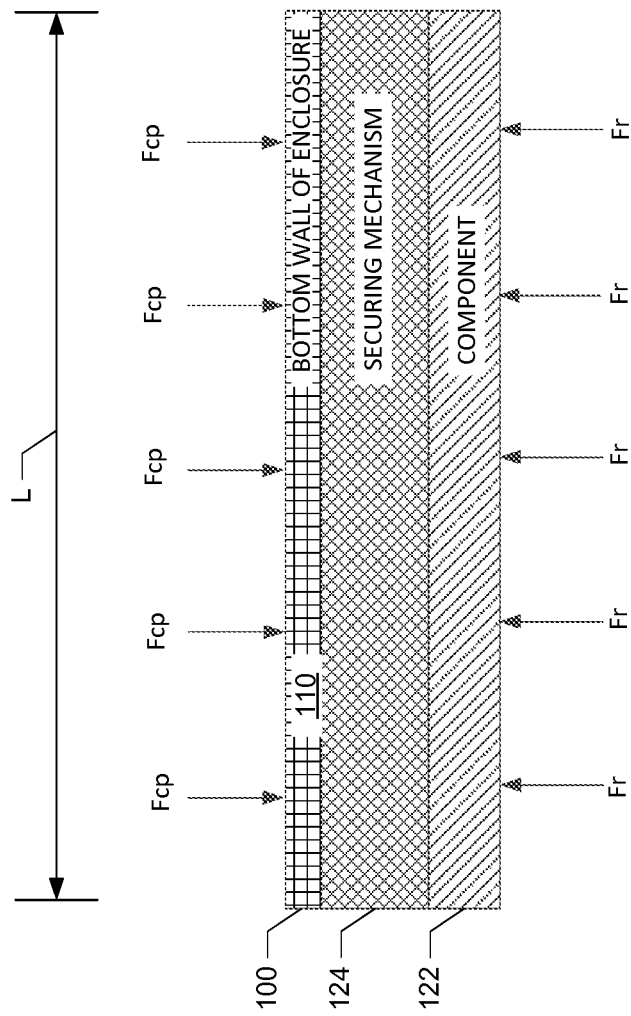
FIG. 5 illustrates a sectional view through the product of FIG. 2 along line A-A and a force profile along a longitudinal length thereof according to an example embodiment of the present disclosure.

As a result, as illustrated in FIG. 5, the reactive force Fr and the centripetal force Fcp may compress the securing mechanism 124 between the component 122 and the bottom wall 110 of the enclosure 100. It should be noted that the force applied to the securing mechanism 124 may vary slightly along a length L thereof perpendicular to the axis 110 in an instance in which the securing mechanism does not define a curved profile matching a rotational path of the product 200. For example, in the illustrated embodiment, as a result of the securing mechanism defining a substantially straight profile along the length L thereof, portions of the securing mechanism may extend to a greater radius R from the axis 110 about which the product 200 is rotated relative to other portions of the securing mechanism along the length thereof.

In order for the force profile along the securing mechanism 124 to be substantially uniform along a length L thereof, the length of the securing mechanism may be configured such that it is substantially less than a distance R to the center of rotation in one embodiment. In other words, the force gradient along the length L of the securing mechanism 124 may be minimized by selecting a length of the securing mechanism that is much less than the radius R about which the product 200 is rotated. For example, in some embodiments the radius R at which the product 200 is rotated may be selected to be at least ten times the length L of the securing mechanism 124 in a direction extending perpendicular to the axis 110 about which the product is rotated in order to reduce the force gradient across the length thereof.

In this regard, by employing a relatively small force gradient across the length L of the securing mechanism 124, a substantially constant bond may be formed between the component 122 and the bottom wall 110 of the enclosure 100 across the length of the securing mechanism when employing a pressure sensitive adhesive. Alternatively, employing a relatively small force gradient across the length L of the securing mechanism 124 may facilitate engagement of a fastener (e.g., a mechanical and/or electrical fastener) in embodiments in which the securing mechanism 124 is configured as such. In this regard, some fasteners may require certain alignments in order to properly engage, which may be caused or maintained by a relatively small force gradient across the length thereof.

In some embodiments, the force and pressure induced between the enclosure 100 and the components 122 can be fixed at a relatively constant value by rotating the product 200 at a substantially constant angular velocity configured to apply a compressive force greater than or equal to a force required to activate the securing mechanism 124. However, in other embodiments, the force and pressure applied to the enclosure 100 and the components 122 may vary over time by employing a variable rate of acceleration of the product 200. In this regard, for example, the rotary table 302 may be rotated at variable rates of acceleration by employing, for example, a gearing mechanism, a variable direct drive motor, or any other mechanism or device configured to provide multiple rotational speeds.

Figure 6:
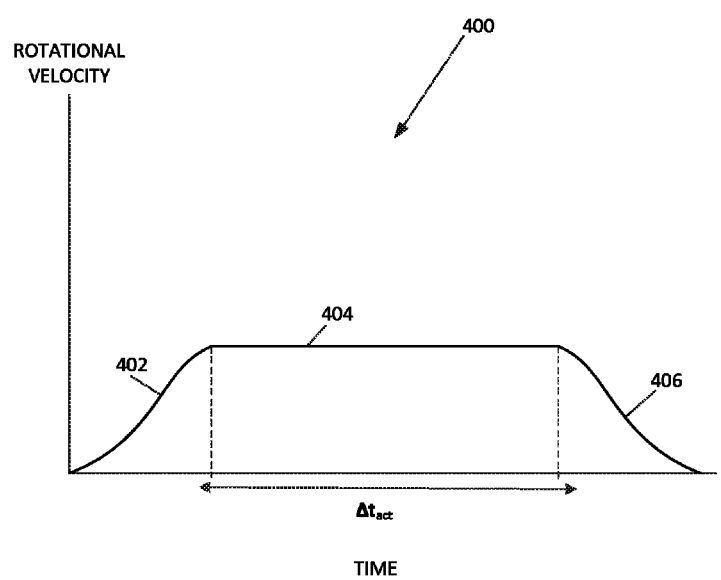
FIG. 6 illustrates a rotational velocity profile associated with rotating a product in a partially assembled configuration according to an example embodiment of the present disclosure.

By way of example, during an assembly operation and in particular during a rotation event, the rotary table 302 can be rotated in accordance with a predetermined rotational velocity profile 400 shown in FIG. 6 commensurate with an angular velocity of the rotary table. The profile 400 can include a ramping up portion 402 (during which rotational velocity of the rotary table 302 increases), a constant velocity 404 (during which rotational velocity of the rotary table is substantially constant), and a ramping down portion 406 (during which the rotational velocity of the rotary table 302 decreases). In some embodiments the acceleration of the rotary table 302 may be substantially constant during the ramping up portion 402 and the ramping down portion 406 and under a threshold magnitude of acceleration in order to protect the components of the product 200 from damage. Further, the force applied to the product 200 during application of the rotational velocity profile 400 may be configured to apply a compressive force greater than or equal to a force required to activate the securing mechanism 124. In particular, in one embodiment the compressive force applied during the constant velocity 404 may be configured to apply a compressive force greater than or equal to a force required to activate the securing mechanism 124

For the described embodiments, activation of the securing mechanism 124 may be generally accomplished during the constant velocity 404. Therefore, in order to fully activate the securing mechanism 124, the constant velocity 404 can extend for a duration of time $\Delta t_{act}$ associated with proper activation. For example, in the case where the securing mechanism 124 comprises a pressure sensitive material, the constant velocity 404 of the profile 400 may be configured to be long enough to activate the pressure sensitive material but not so long as to damage sensitive components.

Figure 7:
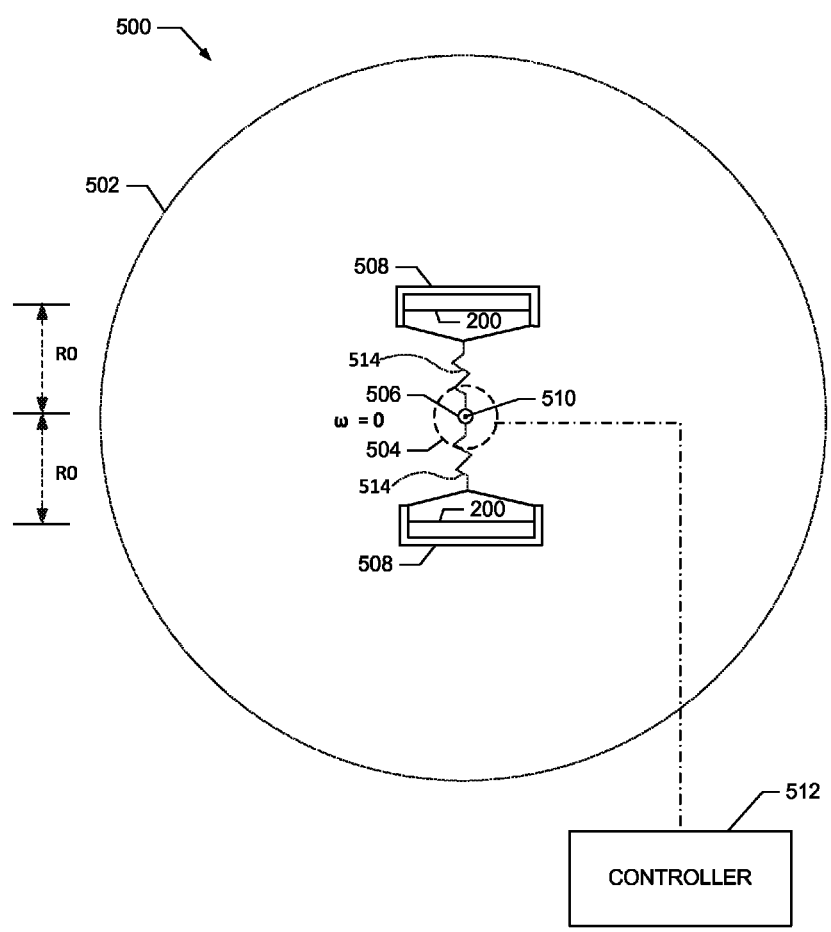
FIG. 7 illustrates a top view of an assembly apparatus including fixtures displaceably coupled to a rotary table via springs in a neutral position according to an example embodiment of the present disclosure.

FIG. 7 shows another embodiment of an assembly apparatus 500, which may be similar to the assembly apparatus 300 of FIG. 3 described above. In this regard, as illustrated, the assembly apparatus 500 may include a rotary table 502 and a motor 510 configured to drive a shaft 506 to rotate the rotary table about a central axis 510. A controller 512 may control the motor 510 (e.g., a rotary speed and direction thereof). Further, the assembly apparatus 500 may include one or more fixtures 508 configured to hold products 200 in a partially assembled configuration therein.

However, rather than being fixedly secured to the rotary table 502, the fixtures 508 and the products 200 may be connected thereto by displaceable members 514. In one embodiment the displaceable members 514 may comprise springs, which may be coupled proximate to the center axis 510 or other devices configured to passively elongate when rotated at a distance from the center axis. However, in other embodiments the displaceable members 514 may actively move toward or away from the center axis 510, for example, as controlled by the controller 512. For example, linear motors may be employed to control the radius R at which the fixtures 508 are positioned from the center axis 510.

Figure 8:
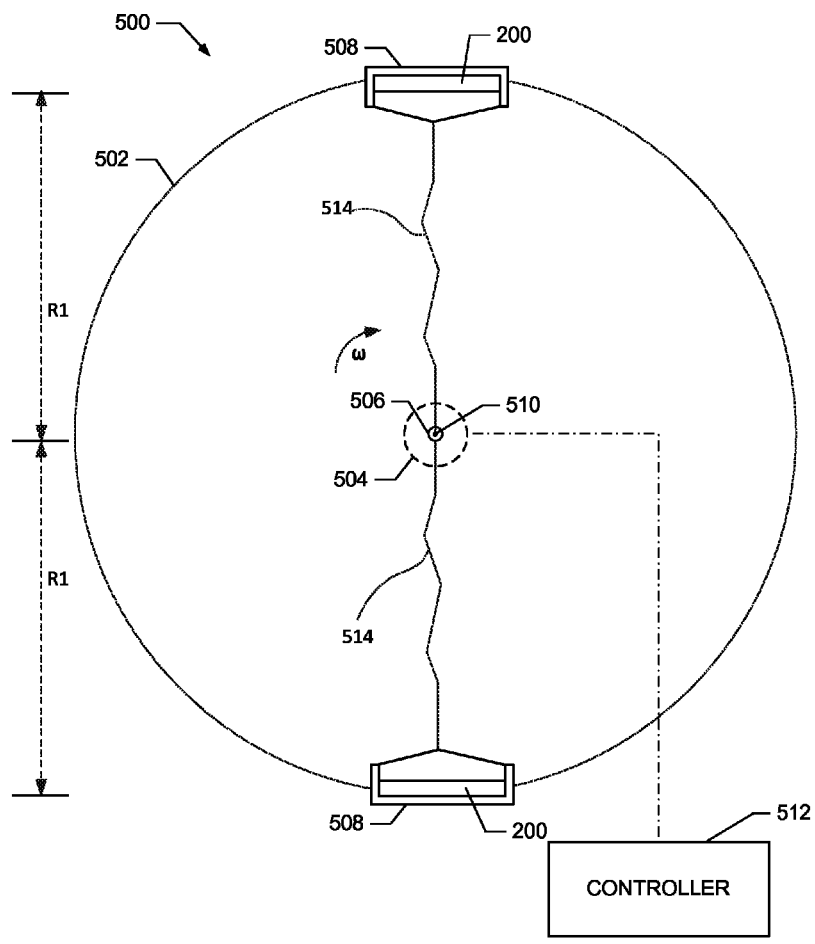
FIG. 8 illustrates a top view of the assembly apparatus of FIG. 7 wherein the fixtures are in an extended position according to an example embodiment of the present disclosure.

Regardless of the particular embodiment of the displaceable members 514, the fixtures 508 may initially be positioned at a radially inward position ($R=R_0$, see FIG. 7) when angular velocity ω is about zero and moved to a radially outward position ($R=R_1$, see FIG. 8) during rotation of the rotary table 502. For example, the rotary table 302 may be rotated according to the above-described velocity profile 400 in some embodiments. Further, the fixture 508 may be moved to the radially outward position in some embodiments when an angular velocity coincides with constant velocity portion 404. In this way, the product 200 may define a spiral trajectory during the rotation of the assembly apparatus 500 of FIGS. 7 and 8 as opposed to the circular trajectory afforded by rotary table 300 of FIG. 3.

Note that while the discussion provided above has generally been in terms of use of compressive forces caused by rotational movement to assemble products, the apparatuses and methods described herein may also be employed for other purposes. For example, in some cases, rework can be performed by placing a product in an assembled configuration (i.e., one in which a component has been secured to an enclosure via a securing mechanism) in a reverse orientation with respect to the center of rotation. In other words, in the embodiments relating to assembly, the product may be oriented such that the component is positioned radially inwardly from the securing mechanism such that rotationally induced force causes the securing mechanism to be compressed between the component and the portion of the enclosure to which the component attaches. Conversely, when the product is undergoing disassembly, the product may be oriented such that the component is positioned radially outwardly from the securing mechanism and the portion of the enclosure to which the securing mechanism attaches is positioned radially inwardly from the securing mechanism such that rotationally induced forces pulls the component away from the securing mechanism and the enclosure. In this way, a force can be applied to the secured component that releases the secured component from the enclosure when the assembly is rotated in the manner described above to conduct a disassembly operation.

Figure 9:
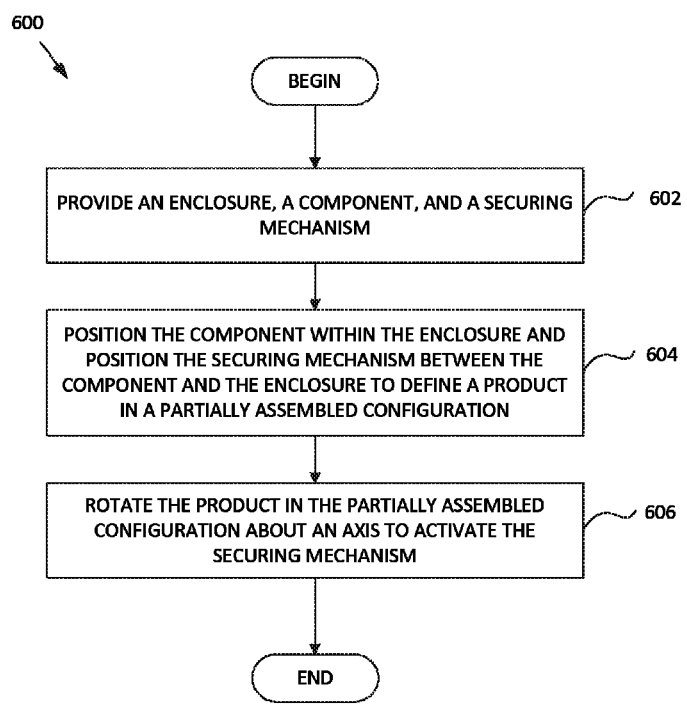
FIG. 9 schematically illustrates an assembly method according to an example embodiment of the present disclosure.

FIG. 9 illustrates a flowchart detailing a method 600 of rotational assembly in accordance with embodiments of the present disclosure. As illustrated, the method may include providing an enclosure, a component, and a securing mechanism at operation 602. Further, the method may include positioning the component within the enclosure and positioning the securing mechanism between the component and the enclosure to define a product in a partially assembled configuration at operation 604. Further, the method may include rotating the product in the partially assembled configuration about an axis to activate the securing mechanism at operation 606.

In some embodiments of the method 600, the securing mechanism may comprise a layer of a pressure sensitive adhesive or a mechanical fastener. Further, rotating the product at operation 606 may comprise rotating the product in accordance with a predetermined rotational velocity profile. The predetermined rotational velocity profile may include a ramping up portion, a constant velocity portion, and a ramping down portion. The constant velocity portion may define a predetermined length of time configured to activate the securing mechanism. Additionally, rotating the product at operation 606 may comprise coupling the product to a fixture and rotating the fixture about the axis.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling assembly operations or as computer readable code on a computer readable medium for controlling assembly operations. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

Figure 10:
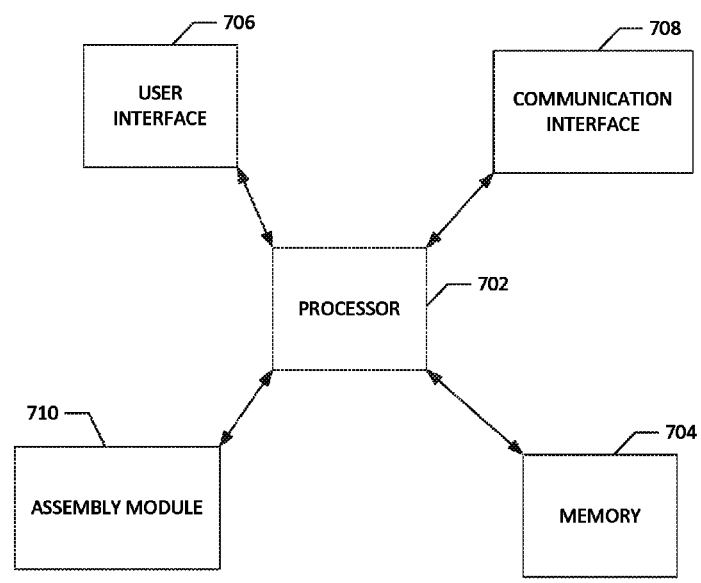
FIG. 10 schematically illustrates a block diagram of an electronic device according to an example embodiment of the present disclosure.

In this regard, FIG. 10 is a block diagram of an electronic device 700 suitable for use with the described embodiments. In one example embodiment the electronic device 700 may be embodied in or as a controller configured for controlling assembly operations as disclosed herein. In this regard, the electronic device 700 may be configured to control or execute the above-described assembly operations performed by the above-described assembly apparatuses 300, 500. In this regard, the electronic device 700 may be embodied in or as the above-described controllers 312, 512.

The electronic device 700 illustrates circuitry of a representative computing device. The electronic device 700 may include a processor 702 that may be microprocessor or controller for controlling the overall operation of the electronic device 700. In one embodiment the processor 702 may be particularly configured to perform the functions described herein relating to assembly operations. The electronic device 700 may also include a memory device 704. The memory device 704 may include non-transitory and tangible memory that may be, for example, volatile and/or non-volatile memory. The memory device 704 may be configured to store information, data, files, applications, instructions or the like. For example, the memory device 704 could be configured to buffer input data for processing by the processor 702. Additionally or alternatively, the memory device 704 may be configured to store instructions for execution by the processor 702.

The electronic device 700 may also include a user interface 706 that allows a user of the electronic device 700 to interact with the electronic device. For example, the user interface 706 can take a variety of forms, such as a button, keypad, dial, touch screen, audio input interface, visual/image capture input interface, input in the form of sensor data, etc. Still further, the user interface 706 may be configured to output information to the user through a display, speaker, or other output device. A communication interface 708 may provide for transmitting and receiving data through, for example, a wired or wireless network such as a local area network (LAN), a metropolitan area network (MAN), and/or a wide area network (WAN), for example, the Internet.

The electronic device 700 may also include an assembly module 710. The processor 702 may be embodied as, include or otherwise control the assembly module 710. The assembly module 710 may be configured for controlling or executing the assembly operations and associated operations as discussed herein.

In this regard, for example, in one embodiment a computer program product comprising at least one computer-readable storage medium having computer-executable program code portions stored therein is provided. The computer-executable program code portions, which may be stored in the memory device 704, may include program code instructions for performing the assembly operations and associated operations disclosed herein. By way of more specific example, a non-transitory computer readable medium for storing computer instructions executed by a processor in a controller configured to assemble an enclosure, a component, and a securing mechanism is provided. The non-transitory computer readable medium may comprise computer code for positioning the component within the enclosure and positioning the securing mechanism between the component and the enclosure to define a product in a partially assembled configuration and computer code for rotating the product in the partially assembled configuration about an axis to activate the securing mechanism.

In some embodiments the computer code for rotating the product may comprise computer code for rotating the product in accordance with a predetermined rotational velocity profile. Further, the computer code for rotating the product in accordance with the predetermined rotational velocity profile comprises computer code for a ramping up portion, a constant velocity portion, and a ramping down portion. The computer code for the constant velocity portion may comprise computer code for rotating the product for a predetermined length of time configured to activate the securing mechanism. The computer program code for rotating the product may comprise computer program code for coupling the product to a fixture and rotating the fixture about the axis. The computer program product may further comprise computer code for adjusting a radial position of the product.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for rotationally assembling an electronic device having a housing, the housing having walls that define a cavity suitable for carrying a component including a securing feature, the method comprising:
   positioning the securing feature within the cavity such that the securing feature is radially disposed from an axis of rotation about which the housing is capable of being rotated; and
   securing the securing feature to at least one of the walls by rotating the housing about the axis of rotation, wherein rotation of the housing causes the component to exert an amount of compressive force at the securing feature in a direction radially disposed from the axis of rotation.

2. The method of claim 1, wherein the housing includes an opening that leads into the cavity, and the securing feature and the component are inaccessible from the opening.

3. The method of claim 1, wherein the rotation of the housing, further causes the at least one wall to exert an additional amount of compressive force at the securing feature that opposes the amount of compressive force.

4. The method of claim 1, wherein the amount of compressive force that is exerted at the securing feature is perpendicular to the axis of rotation.

5. The method of claim 1, wherein the amount of compressive force is related to a predetermined rotational velocity of the housing, and the predetermined rotational velocity includes at least one of a ramping up portion, a constant velocity portion, or a ramping down portion.

6. The method of claim 5, wherein the constant velocity portion corresponds to a predetermined length of time for activating the securing feature.

7. The method of claim 3, wherein the amount of compressive force includes a reactive force and the additional amount of compressive force includes a centripetal force.

8. An assembly apparatus for rotationally assembling a component within an enclosure for an electronic device, wherein the enclosure includes walls that define an internal cavity capable of carrying the component that includes a securing mechanism that is inaccessible from an opening of the enclosure, the assembly apparatus comprising: a rotary table that secures the enclosure that carries the component and the securing mechanism, wherein the securing mechanism is radially disposed from an axis of rotation of the rotary table; and a motor coupled to the rotary table, the motor capable of rotating the rotary table about the axis of rotation to generate a rotational compressive force at the securing mechanism in a direction that is radially disposed from the axis of rotation; thereby causing the component to become secured to at least one of the walls via the securing mechanism.

9. The assembly apparatus of claim 8, wherein the enclosure is secured to the rotary table via fixtures.

10. The assembly apparatus of claim 9, wherein the fixtures are coupled to the rotary table via a displaceable member.

11. The assembly apparatus of claim 10, wherein the displaceable member comprises a spring.

12. The assembly apparatus of claim 8, wherein the rotational compressive force is related to a rotational velocity of the enclosure.

13. The assembly apparatus of claim 8, wherein the rotational compressive force is related to a distance from the axis of rotation and the securing mechanism.

14. The assembly apparatus of claim 8, wherein the securing mechanism comprises a mechanical fastener or a pressure sensitive adhesive.

15. The method of claim 1, wherein the securing feature includes a mechanical fastener or a pressure sensitive adhesive.

16. The method of claim 1, wherein the securing feature is laterally compressed during the rotation of the housing.

17. The method of claim 1, further comprising:
   securing the housing to a surface of a rotary table, wherein the housing is secured to the surface via a fixture; and
   securing the fixture to a displaceable member, the displaceable member being associated with the axis of rotation of the rotary table, wherein the displaceable member allows the fixture to move towards or away from the axis of rotation during rotation of the rotary table.

18. A system for rotationally assembling an electronic device, the system comprising:
   a controller unit that provides a control signal; and
   a rotary table coupled to a driving mechanism, the rotary table capable of carrying an enclosure for the electronic device, the enclosure including an internal cavity capable of carrying a component having a securing feature, wherein the driving mechanism causes the rotary table to rotate relative to an axis of rotation about which the enclosure is capable of being rotated when the control signal is received from the controller unit, thereby causing a compressive force having a direction that is radially disposed from the axis of rotation to be applied to the securing feature.

19. The system of claim 18, wherein the compressive force is related to a predetermined rotational velocity of the enclosure.

20. The system of claim 18, wherein the compressive force includes a reactive force and a centripetal force, and the reactive force and the centripetal force oppose each other.

* * * * *